(12) United States Patent
Wang et al.

(10) Patent No.: US 9,092,422 B2
(45) Date of Patent: Jul. 28, 2015

(54) CATEGORY-SENSITIVE RANKING FOR TEXT

(75) Inventors: Yi Wang, Beijing (CN); Bo Tao, Los Altos, CA (US); Zhiyuan Liu, Beijing (CN)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/520,012

(22) PCT Filed: Dec. 30, 2009

(86) PCT No.: PCT/CN2009/001584
§ 371 (c)(1),
(2), (4) Date: Jun. 29, 2012

(87) PCT Pub. No.: WO2011/079416
PCT Pub. Date: Jul. 7, 2011

(65) Prior Publication Data
US 2012/0278332 A1    Nov. 1, 2012

(51) Int. Cl.
*G06F 17/30*    (2006.01)
*G06F 17/27*    (2006.01)

(52) U.S. Cl.
CPC ........ *G06F 17/277* (2013.01); *G06F 17/30719* (2013.01)

(58) Field of Classification Search
None
See application file for complete search history.

(56) References Cited

U.S. PATENT DOCUMENTS

| | | | |
|---|---|---|---|
| 6,990,485 B2 * | 1/2006 | Forman et al. | 707/737 |
| 7,421,498 B2 * | 9/2008 | Packer | 709/225 |
| 8,650,031 B1 * | 2/2014 | Mamou et al. | 704/235 |
| 2003/0225773 A1 * | 12/2003 | Jenssen et al. | 707/100 |
| 2004/0225667 A1 * | 11/2004 | Hu et al. | 707/100 |
| 2005/0050222 A1 * | 3/2005 | Packer | 709/238 |
| 2005/0187892 A1 * | 8/2005 | Goutte et al. | 707/1 |
| 2006/0242013 A1 * | 10/2006 | Agarwal et al. | 705/14 |
| 2008/0010274 A1 * | 1/2008 | Carus et al. | 707/5 |

(Continued)

FOREIGN PATENT DOCUMENTS

| | | |
|---|---|---|
| CN | 101079031 | 11/2007 |
| CN | 101114281 | 1/2008 |

(Continued)

OTHER PUBLICATIONS

International Search Report and Written Opinion in International Application No. PCT/CN2009/001584, mailed Oct. 28, 2010, 10 pages.

(Continued)

*Primary Examiner* — Richard Bowen
(74) *Attorney, Agent, or Firm* — Fish & Richardson P.C.

(57) ABSTRACT

Provided are methods, systems and apparatus which include computer program products, for generating topic models for text summarization In one aspect, a method includes receiving a first document of text that is associated with one or more category labels and that includes one or more sequences of one or more words, determining a category label that represents a first category associated with the first document, sampling the one or more sequences to determine a topic and a co-occurrence relationship between the topic and the category label, where a topic represents a subdivision within a category, sampling the one or more sequences to determine a co-occurrence relationship between a sequence in the first document and the topic, and generating a category-topic model that represents the co-occurrence relationships.

20 Claims, 5 Drawing Sheets

(56) References Cited

U.S. PATENT DOCUMENTS

| | | | |
|---|---|---|---|
| 2008/0109399 A1* | 5/2008 | Liao et al. | 707/2 |
| 2008/0147654 A1* | 6/2008 | Cao et al. | 707/6 |
| 2008/0320010 A1* | 12/2008 | Li et al. | 707/100 |
| 2010/0217764 A1* | 8/2010 | Labrou et al. | 707/738 |
| 2010/0228730 A1* | 9/2010 | Muller et al. | 707/736 |

FOREIGN PATENT DOCUMENTS

| | | |
|---|---|---|
| CN | 101393545 | 3/2009 |
| JP | 2006139717 | 6/2006 |

OTHER PUBLICATIONS

Cohn and Chang, "Learning to probabilistically identify authoritative documents," In ICML '00 Proceedings of the Seventeenth International Conference on Machine Learning, 167-174, 2000.

Carbonell and Goldstein, "The use of MMR, diversity-based reranking for reordering documents and producing summaries," In SIGIR, 335-336, 1998.

Lin and Hovy, "Automatic evaluation of summaries using N-gram co-occurrence statistics," NAACL '03, 71-78, May 27-Jun. 1, 2003.

Litvak and Last, "Graph-Based Keyword Extraction for Single-Document Summarization," In Proceedings of the Workshop on Multi-source Multilingual Information Extraction and Summarization, 17-24, Aug. 2008.

Wan et al., "Towards an Iterative Reinforcement Approach for Simultaneous Document Summarization and Keyword Extraction," Proceedings of the 45th Annual Meeting of the Association for Computational Linguistics, 552-559, Jun. 23-30, 2007.

Wan, "An exploration of document impact on graph-based multi-document summarization," Proceedings of the Conference on Empirical Methods in Natural Language Processing, 755-762, Oct. 2008.

\* cited by examiner

CATEGORY-SENSITIVE RANKING FOR TEXT

CROSS-REFERENCE TO RELATED APPLICATION

This application is a National Stage Application under 35 U.S.C. §371 and claims the benefit of International Application No. PCT/CN2009/001584, filed Dec. 30, 2009. The disclosure of the foregoing application is hereby incorporated by reference in its entirety.

BACKGROUND

This specification relates to digital data processing, and in particular, to computer-implemented category-sensitive ranking for text.

Automatic summarization is the generation of a summary of a text by a computer process, e.g., a text summarization service. Text summarization services rank words or sentences of textual data, e.g., text on a webpage, to identify portions of the textual data that can be extracted and included in a summary of the textual data. In some situations, textual data can be associated with a topic. A particular word in the textual data can be ranked according to the expression P(z|x)P(x|z), where z is a topic and x is a word. The expression represents the probability of topic z being associated with the textual data given that word x occurs in the textual data multiplied by the probability of word x occurring in the textual data given that topic z is associated with the textual data.

Some text summarization services use topics that are not human-readable, e.g., topics consisting of a combination of words or characters that do not have semantic meaning in natural human language. These topics may not provide insight into the semantic meanings of the words and sentences in the textual data. The meanings of the words and sentences can be relevant to generating a summary of the textual data.

SUMMARY

This specification describes technologies relating to generation of topic models for text summarization.

In general, one aspect of the subject matter described in this specification can be embodied in methods that include the actions of receiving a first document of text that is associated with one or more category labels and that includes one or more sequences of one or more words; determining a category label that represents a first category associated with the first document; sampling the one or more sequences to determine a topic and a co-occurrence relationship between the topic and the category label, where a topic represents a subdivision within a category; sampling the one or more sequences to determine a co-occurrence relationship between a sequence in the first document and the topic; and generating a category-topic model that represents the co-occurrence relationships. Other embodiments of this aspect include corresponding systems, apparatus, and computer program products.

The foregoing and following embodiments can optionally include one or more of the following features. The generating includes determining, from the co-occurrence relationship between the topic and the category label, a first probability of the topic being associated with a document given that the category label is associated with the document; and determining, from a co-occurrence relationship between the sequence and the topic, a second probability of the sequence occurring in the document given that the topic is associated with the document. Determining the co-occurrence relationships includes: calculating a frequency of co-occurrence of the topic and the category label in the document; and calculating a frequency of co-occurrence of the sequence and the topic in the document.

The sampling is represented using the expression:

$$P(u_{d,i} = c, z_{d,i} = k \mid w_{d,i} = v, w_{d,-i}, z_{d,-i}, u_{d,-i}, y_d, \alpha, \beta) = \frac{C_{v,k}^{WT} + \beta}{\sum_{v'=1}^{V} C_{v',k}^{WT} + V\beta} \frac{C_{k,c}^{TC} + \alpha}{\sum_{k'=1}^{K} C_{k',c}^{TC} + K\alpha};$$

where $u_{d,i}$, is a category label; c is a particular category; $z_{d,i}$ is a topic; k is a particular topic; $w_{d,i}$ is sequence of one or more words; v is a particular sequence of one or more words; $C_{v,k}^{WT}$ is a number of times that topic k is assigned to sequence v, not including a current instance of sampling i; $C_{k,c}^{TC}$ is a number of times that topic k is assigned to category c, not including the current instance of sampling i; $\alpha$ is a constant; $\beta$ is a constant; and d is a document.

Each sampling is performed independently on multiple processors, each processor p calculates an update $\Delta C_{|p}^{WT}$ and an update $\Delta C_{|p}^{TC}$, and the frequencies of co-occurrences are updated according to the equations $$C^{WT} \mathrel{+}= \sum_{p=1}^{P} \Delta C_{|p}^{WT} \text{ and } C^{TC} \mathrel{+}= \sum_{p=1}^{P} \Delta C_{|p}^{TC}.$$

Determining the first and second probabilities includes: calculating the conditional probabilities that the topic is k given that the category label is c, the sequence is v given that the topic is k, the category label is c given that the topic is k, and the topic is k given that the sequence is v. The conditional probabilities satisfy the expressions:

$$P(z = k \mid u = c) = \frac{C_{k,c}^{TC} + \alpha}{\sum_{k'} C_{k',c}^{TC} + K\alpha};$$

$$P(w = v \mid z = k) = \frac{C_{v,k}^{WT} + \beta}{\sum_{v'} C_{v',k}^{WT} + V\beta};$$

$$P(u = c \mid z = k) = \frac{C_{k,c}^{TC} + \alpha}{\sum_{c'} C_{k,c'}^{TC} + C\alpha}; \text{ and}$$

$$P(z = k \mid w = v) = \frac{C_{v,k}^{WT} + \beta}{\sum_{k'} C_{v,k'}^{WT} + K\beta}.$$

The category-topic model represents co-occurrence relationships between topics and category labels determined by sampling one or more sequences of one or more words in each of a collection of received documents, and co-occurrence relationships between the sequences in each document and the topics determined by sampling the one or more sequences of one or more words in each of the collection of received documents.

The method further includes receiving a textual input; determining in the textual input one or more sequences of one or more words that are each associated with a respective category; ranking each of the determined sequences using the category-topic model; identifying one or more of the sequences that have a ranking greater than a threshold ranking value; and generating a summary of the textual input that includes the identified sequences. The ranking includes calculating a probabilistic characteristic value for each sequence of one or more words, where the probabilistic characteristic value is expressed as:

$$P(w \mid c)P(c \mid w) = \left[\sum_{z=1}^{K} P(w \mid z)P(z \mid c)\right]\left[\sum_{z=1}^{K} P(z \mid w)P(c \mid z)\right],$$

where w is a sequence of one or more words, c is a category, and z is a topic.

The category labels are human-readable. At least one of the topics is not human-readable. A sequence of one or more words is a phrase, sentence, or paragraph. The first document includes category labels that represent the one or more categories, and determining the category label includes selecting one of the category labels. Determining the category label includes assigning a unique label to the first document.

In general, another aspect of the subject matter described in this specification can be embodied in methods that include the actions of receiving a textual input; receiving a category-topic model that represents co-occurrence relationships between topics and category labels and co-occurrence relationships between sequences of one or more words and topics; determining in the textual input one or more sequences of one or more words that are each associated with a respective category label; ranking each of the determined sequences using the category-topic model; identifying one or more of the sequences that have a ranking greater than a threshold ranking value; and generating a summary of the textual input that includes the identified sequences. Other embodiments of this aspect include corresponding systems, apparatus, and computer program products.

The foregoing and following embodiments can optionally include one or more of the following features. The category-topic model is produced by a method in accordance with the methods and features described in the foregoing embodiments.

Particular embodiments of the subject matter described in this specification can be implemented to realize one or more of the following advantages. Using categories and topics to rank sequences of words increases an accuracy and precision of the ranking. In addition to improving the accuracy and precision of the ranking, recall, e.g., the number of relevant sequences of text divided by the total number of relevant sequences of text that should have been returned, during text summarization can be increased. Increasing the number of sequences of words that are accurately and precisely identified from a text as being relevant to the text improves the quality of summaries of the text.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
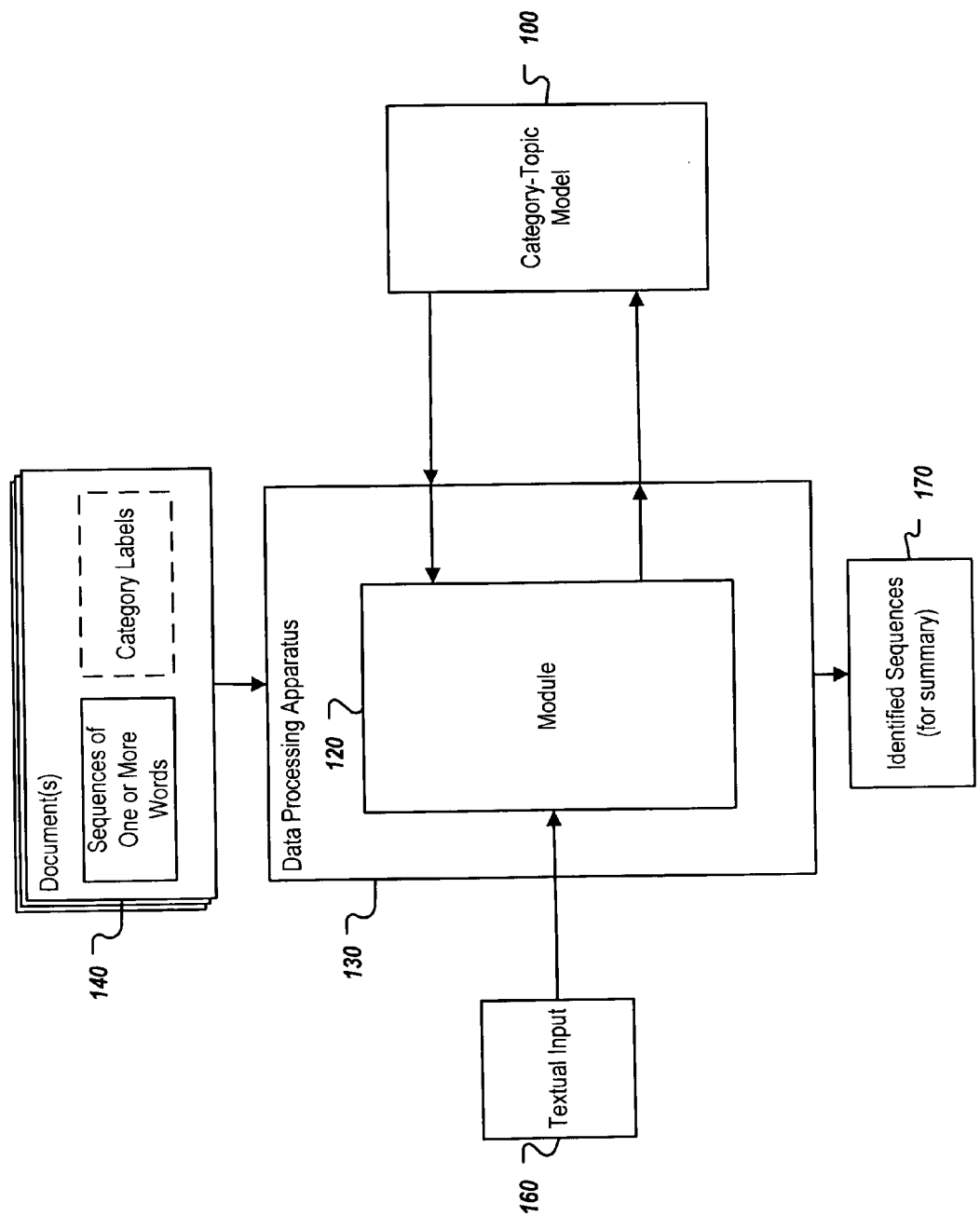
FIG. 1 is a block diagram illustrating an example of a flow of data in some implementations of a system that generates a category-topic model.

FIG. 1 is a block diagram illustrating an example of a flow of data in some implementations of a system that generates a category-topic model (CTM) 100. A module 120 installed on a data processing apparatus 130, e.g., a computer, receives one or more documents, e.g., a collection of training data that includes document 140. Each document can include one or more sequences of one or more words. In a natural language, the sequences of words can be a phrase, sentence, or a paragraph.

In general, each document is associated with one or more categories by virtue of one or more category labels. In some cases, a document is associated with a category by virtue of a category label that is found in the body of the document. For example, the document can include pre-existing category labels, e.g., an Extensible Markup Language (XML) document that includes metadata (e.g., one or more XML element attributes) that corresponds to the category labels. In some cases, a document is associated one or more category labels that are external to the document, e.g., one or more category labels stored in a database external to the document. For example, one or more category labels in a database can be indicated as being associated with a webpage by associating the Uniform Resource Locater (URL) that identifies the webpage with the one or more category labels. In some cases, a document is not initially associated with a category label. A unique label, e.g., a document identifier, can be assigned to each of the documents that is not initially associated with a category label, as described in further detail below.

As an example, the document 140 can be a webpage of an e-business website. The sequences of words in the text of the webpage can be single words, phrases, sentences, or paragraphs from the text. The text of the webpage can be user reviews of consumer products and be related to particular groups of consumer products. As an example, if a category label "mobile phones" is associated with the document 140, the words on the webpage are likely to be related to mobile phones. As another example, if a category label "cars" is associated with the document 140, the words on the webpage are likely to be related to cars.

In general, category labels are human-readable names of respective categories. Text can be considered human readable if the text has semantic meaning in natural human language. For example, a first category can be associated with a category label "mobile phones", and a second category can be associated with a category label "cars". In the example, the category labels are human-readable and indicate that documents classified under the respective categories are related to "mobile phones" or "cars".

The module 120 uses the sequences of one or more words of the documents and category labels to generate the category-topic model 100. The module 120 samples the sequences of one or more words to determine topics, co-occurrence relationships between a topic and a category label, and co-occurrence relationships between a sequence of one or more words and the topic, as described in further detail below. The category-topic model 100 represents the co-occurrence relationships.

Topics can be subdivisions within a category. In some cases, topics are human-readable. Returning to the previous examples, topics for the category associated with the category label "mobile phone" can be "size", "weight", and "stand-by time"; and topics for the category associated with the category label "car" can be "safety", "exterior/interior design", and "equipment packages". In some cases, topics are not human-readable. For example, the topics can be generated by clustering words that frequently co-occur in training data, e.g., a cluster of words that does not have semantic meaning.

The module 120 can receive a textual input 160, use the category-topic model 100 to rank sequences of one or more words in the textual input 160 to identify one or more of the sequences in the textual input 160 that can be used to generate a summary of the textual input 160. The summary of the textual input 160 includes the one or more identified sequences 170.

Figure 2:
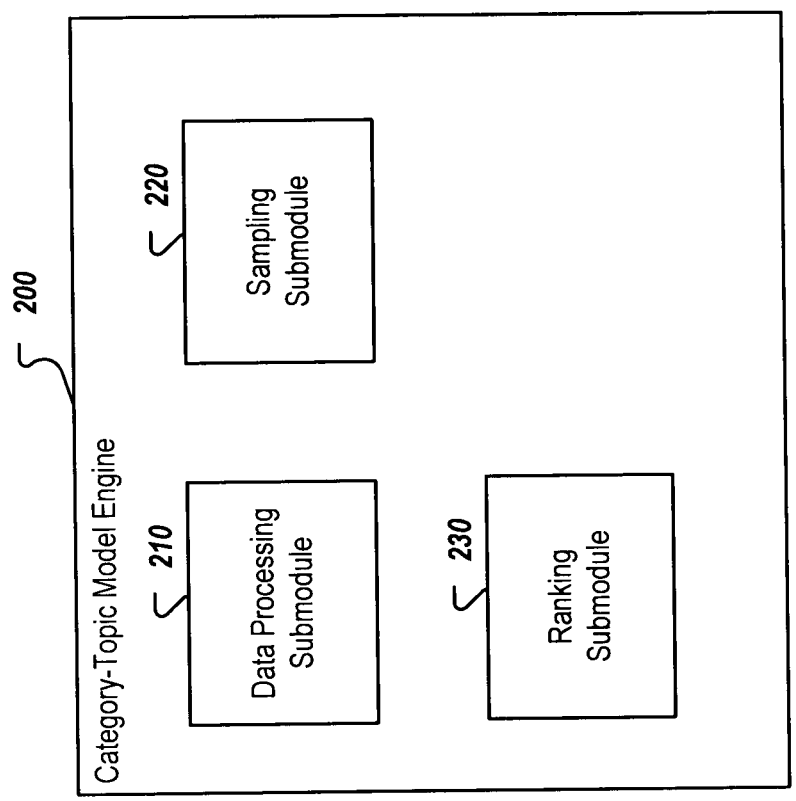
FIG. 2 is a block diagram illustrating an example category-topic model engine.

FIG. 2 is a block diagram illustrating an example category-topic model engine 200. The CTM engine 200 includes a data processing submodule 210, a sampling submodule 220 and a ranking submodule 230.

The data processing submodule 210 receives the documents. The data processing submodule 210 parses the documents to identify $N_d$ sequences of one or more words $w_{d,i}=\{w_{d,1}, \ldots, w_{d,N_d}\}$, where d is a document, e.g., document 140, and $N_d$ is an integer greater than zero. The $N_d$ sequences of one or more words can include words selected from a dictionary of V unique words.

The data processing submodule 210 also determines if the received document 140 is associated with pre-existing category labels. If the document 140 is associated with one or more category labels, the data processing submodule 210 identifies the received $L_d$ category labels, $y_{d,i}=\{y_{d,1}, \ldots, y_{d,L_d}\}$, where $L_d$ is an integer greater than zero. The $L_d$ category labels from all the documents define a collection of C unique labels. If the document 140 is not associated with a category label, the data processing submodule 210 can assign an arbitrary unique label, e.g., a document identifier, to facilitate sampling of documents that do not initially include a category label. In some implementations, the document identifier is a fingerprint, e.g., a 64-bit hash value that is computed from the content of the document 140. The data processing submodule 210 provides the identified sequences and category labels to the sampling submodule 220.

Figure 3B:
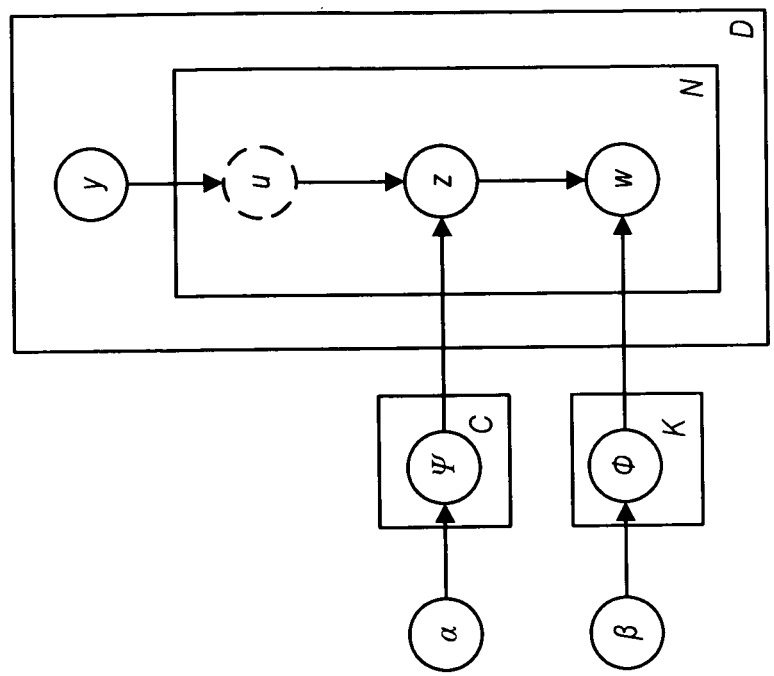
FIG. 3B is a block diagram illustrating an example plate notation of a category-topic model.
Figure 3A:
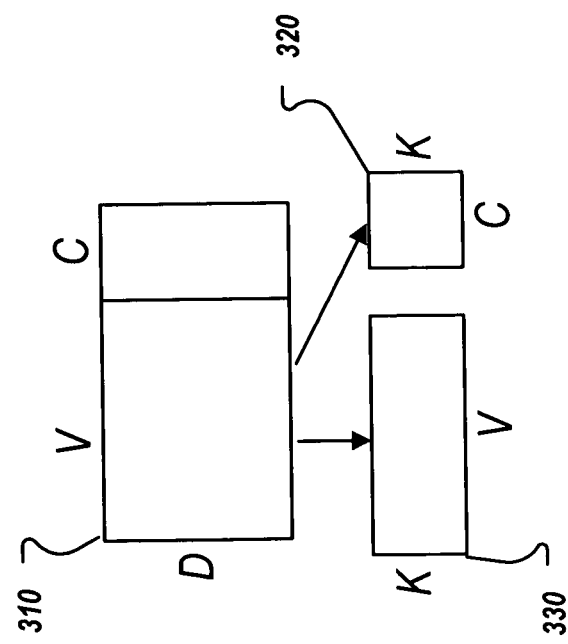
FIG. 3A is a block diagram illustrating an example of a flow of data for a category-topic model.

FIG. 3A is a block diagram illustrating an example of a flow of data for generating a category-topic model 100. The category-topic model engine 200 receives D documents 310 that include V sequences of one or more words and C categories, and provides relationships between K topics and C categories, e.g., a K×C Markov matrix 320, and relationships between the V sequences and K topics, e.g., a K×V Markov matrix 330.

For each sequence $w_{d,i}$ in a document d, the category-topic model engine 200 selects a category label $u_{d,i}$ from $y_d$. The category label $u_{d,i}$ can be selected uniformly at random. The category-topic model engine 200 determines a topic $z_{d,i}$ by sampling the sequences of one or more words of the document d. In some implementations, the topic is determined, e.g., generated, in the sampling by clustering words that frequently co-occur. Words that frequently co-occur may have similar semantic meanings. The category-topic model engine 200 also determines a co-occurrence relationship between the topic and the category label. The co-occurrence relationship can be used to calculate the probability that the topic $z_{d,i}$ is associated with the document d given that the category label $u_{d,i}$ is associated with the document d, or $P(z|u_{d,i})$. The category-topic model engine 200 also samples the sequences of one or more words to determine a co-occurrence relationship between a sequence $w_{d,i}$ and the topic $z_{d,i}$. The co-occurrence relationship can be used to calculate the probability that the sequence w occurs in the document d given that the topic $z_{d,i}$ is associated with the document, or $P(w|z_{d,i})$.

FIG. 3B is a block diagram illustrating an example plate notation of a category-topic model, e.g., a Bayesian network. In FIG. 3B, α is a parameter, e.g., an observable or specified constant, of a topic-category distribution Ψ, e.g., a K×C Markov matrix as shown in FIG. 3A. β is a parameter, e.g., an observable or specified constant, of word-topic distribution Φ, e.g., a K×V Markov matrix as shown in FIG. 3B.

The sampling submodule 220 samples D documents. The D documents can be represented as $\Omega=\{(w_1, y_1), \ldots (w_D, y_D)\}$. In some implementations, Gibbs sampling is performed. The sampling submodule 220 samples $u_{d,i}$ and $z_{d,i}$ for each sequence of one or more words $w_{d,i}$ as a block from a full conditional posterior distribution. Using the Dirichlet-multinomial conjugacy, the sampling can be performed using the following Equation (1):

$$P(u_{d,i}=c, z_{d,i}=k \mid w_{d,i}=v, w_{d,-i}, z_{d,-i}, u_{d,-i}, y_d, \alpha, \beta) = \frac{C_{v,k}^{WT}+\beta}{\sum_{v'=1}^{V} C_{v',k}^{WT}+V\beta} \frac{C_{k,c}^{TC}+\alpha}{\sum_{k'=1}^{K} C_{k',c}^{TC}+K\alpha} \quad (1)$$

where $u_{d,i}$ is a category label; c is a particular category; $z_{d,i}$ is a topic; k is a particular topic; $w_{d,i}$ is a sequence of one or more words; v is a particular sequence of one or more words; $C_{v,k}^{WT}$ is a number of times that topic k is assigned to sequence v (e.g., where $C^{WT}$ represents a frequency of co-occurrences of topics and sequences of one or more words), not including a current instance of sampling i; $C_{k,c}^{TC}$ is a number of times that topic k is assigned to category c (e.g., where $C^{TC}$ represents a frequency of co-occurrences of topics and categories), not including the current instance of sampling i; α is a constant; β is a constant; and d is a document in which the first textual input is included.

The category-topic model 100 can be represented using the following conditional probabilities, i.e., the following Equations (2)(i)-(2)(iv), that are estimated using the values of $C^{WT}$ and $C^{TC}$ from Equation (1):

$$P(z=k \mid u=c) = \frac{C_{k,c}^{TC}+\alpha}{\sum_{k'} C_{k',c}^{TC}+K\alpha} \quad (2)(i)$$

$$P(w=v \mid z=k) = \frac{C_{v,k}^{WT}+\beta}{\sum_{v'} C_{v',k}^{WT}+V\beta} \quad (2)(ii)$$

$$P(u=c \mid z=k) = \frac{C_{k,c}^{TC}+\alpha}{\sum_{c'} C_{k,c'}^{TC}+C\alpha} \quad (2)(iii)$$

$$P(z=k \mid w=v) = \frac{C_{v,k}^{WT}+\beta}{\sum_{k'} C_{v,k'}^{WT}+K\beta} \quad (2)(iv)$$

In some implementations, the sampling is performed using multiple processors, i.e., P distinct processors. In this context, the P distinct processors are distinct computers that can work in parallel. Sampling using the multiple computers facilitates generation of a category-topic model 100 from a large collection of documents, e.g., a collection including more than one billion documents. In particular, the documents can be distributed over the P distinct processors. Each processor of the P distinct processors generates and maintains values of $C^{TC}$ and $C^{WT}$ that are independent from those maintained by the other processors.

As an example, D documents can be represented as $\Omega=\{(w_1, y_1), \ldots (w_D, y_D)\}$. Assignments of categories to sequences of one or more words in $\Omega$ can be represented as $\lambda=\{u_d\}_{d=1}^D$ and assignments of topics can be represented as $Z=\{d_d\}_{d=1}^D$. Given P processors, the sampling module 220 partitions documents and corresponding assignments into P disjoint subsets $\Omega=\{\Omega_p\}_{p=1}^P$ of documents, $U=\{U_p\}_{p=1}^P$ of category labels, and $Z=\{Z_p\}_{p=1}^P$ of topics; where $\Omega_p$, $U_p$, $Z_p$ are associated only with processor p.

Gibbs sampling is performed simultaneously and independently on each of the P processors, where each processor only modifies its own copy of $C^{TC}$ and $C^{WT}$. After each Gibbs sampling iteration, each processor p generates an update to $C^{TC}$, i.e., $\Delta C_{|p}^{TC}$, and an update to $C^{WT}$, i.e., $\Delta C_{|p}^{WT}$. The sampling submodule 220 obtains the updates from the processors and calculates the co-occurrence relationships according to the equations $$C^{WT} \mathrel{+}= \sum_{p=1}^{P} \Delta C_{|p}^{WT} \text{ and } C^{TC} \mathrel{+}= \sum_{p=1}^{P} \Delta C_{|p}^{TC}.$$

In some implementations, MapReduce is used to perform each sampling iteration. MapReduce is described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004). Each Gibbs sampling iteration can be modeled by a MapReduce task. In the map stage, the processors perform the Gibbs sampling simultaneously, and in the reduce stage the updates from the processors are collected and used to update the category-topic model 100.

In some situations, each document is associated with only one category label. In these situations, sampling can be performed using Equation (3):

$$P(z_{d,i} = k \mid w_{d,i} = w_{d,-i}, z_{d,-i}, u_{d,-i}, y_d = c, \alpha, \beta) = \tag{3}$$

$$\frac{C_{v,k}^{WT} + \beta}{\sum_{v'=1}^{V} C_{v,k}^{WT} + V\beta} \frac{C_{k,c}^{TC} + \alpha}{\sum_{k'=1}^{K} C_{k,c}^{TC} + K\alpha}$$

In some situations, the sequences of one or more words in the document 140 are not related to a category that is represented by the $L_d$ category labels. In some implementations, Equation (3) can be used to estimate a topic distribution in the document 140. In particular, $C^{TC}$ in Equation (3) degenerates into a vector that represents relationships between topics and a unique label, e.g., a document identifier that is assigned to the document 140. After the sampling stabilizes, e.g., when the variance of changes in the likelihoods generated by the last few (e.g., five) sampling iterations is less than 0.1% of the variance of the likelihoods generated by the first few (e.g., five) sampling iterations, the vector can be added into $C^{TC}$ of the category-topic model 100.

The ranking submodule 230 can rank the sequences of one or more words in the document 140 using conventional techniques. In some implementations, given a category c, the sequences of one or more words in a document d can be ranked using a probabilistic characteristics value, which can be expressed, as shown in Equation (4), as:

$$P(w \mid c) P(c \mid w) = \left[\sum_{z=1}^{K} P(w \mid z) P(z \mid c)\right] \left[\sum_{z=1}^{K} P(z \mid w) P(c \mid z)\right] \tag{4}$$

In some situations, a sequence of one or more words w that occurs frequently may not be important in a category c, i.e., may not be particularly relevant to category c. Equation (4) calculates P(w|c) as a summation over topics so that only topics of w that are related to c contribute to the ranking P(w|c)P(c|w). As an example, the word "apple" may be related to two topics: "fruit" and "computer". When summarizing textual input, e.g., electronic product reviews, only occurrences of "apple" with topic "computer" may be relevant to the category for "electronics". Using the category-topic model 100, the probability that the word "apple" occurs in the document given that the category is related to "electronics" can be rewritten as:

$$P(w = \text{apple} \mid c = \text{electronics}) =$$

$$\sum_{z=\ldots,\text{fruit,computer}\ldots} P(w = \text{apple} \mid z) P(z \mid c = \text{electronics}).$$

In practice, "computer" may be the only topic related to "apple" that is related to or relevant to the category for "electronics". The ranking accounts for this situation and can be expressed as:

$P(w=\text{apple}|c=\text{electronics}) \approx P(\text{apple}|\text{computer}) P(\text{computer}|\text{electronics}).$ In some situations, a rare word w may be important to a category c, e.g., where a majority of occurrences of w are associated with topics that are relevant to c. Again, the category-topic model 100 computes P(c|w) as a summation over topics. For topics z for which w is particularly relevant, P(c|w) is large despite the low frequency of w, thereby increasing the ranking. If one or more of the topics is particularly relevant to c, then P(z|c) is large despite the low frequency of w, thereby increasing the ranking. As an example, the probabilities P(c|w) and P(z|c) can each be considered large when they are greater than 0.6, and the frequency of w can be considered low when w occurs only once or twice in training data.

In some alternative implementations, the ranking can be performed using Kullback-Leibler divergence (KL divergence) or predictive-likelihood.

The category-topic model 100 can be used to rank sequences of one or more words in text and summarize the text. The category-topic model engine 200 can receive textual input 160, e.g., text from another collection of textual documents, and use the category-topic model 100 to rank sequences of one or more words in the textual input 160 to identify one or more of the sequences 170 in the textual input 160 that can be used to generate a summary of the textual input 160.

The textual input can be represented as $\Lambda=\{w_d\}_{d=1}^{D'}$. The sequences of one or more words $w_d$ in the D' documents can be ranked by the ranking submodule 230 using Equation (4) as described above. Using the textual input 160, the data processing submodule 210 can assign a topic to each sequence of one or more words in $\Lambda$ using Equation (3). After each Gibbs sampling iteration performed by the sampling submodule 220, the sampling submodule 220 calculates $C_{d,z}^{DT}$, a matrix representing a frequency of co-occurrences of each topic $z \in [1, K]$ and each sequence $w_d$. After the sampling stabilizes, $C^{DT}$ can be used to estimate $$P(w_d \mid z) = \frac{C_{d,k}^{DT} + \alpha}{\sum_d C_{d',c}^{DT} + D'\alpha} \text{ and } P(z \mid w_d) = \frac{C_{d,k}^{DT} + \alpha}{\sum_d C_{d,c'}^{DT} + K\alpha}.$$

The ranking can be represented by the probabilistic characteristic value:

$$P(w_d \mid z)P(z \mid w_d) = \frac{C_{d,k}^{DT} + \alpha}{\sum_d C_{d',c}^{DT} + D'\alpha} \frac{C_{d,k}^{DT} + \alpha}{\sum_d C_{d,c'}^{DT} + K\alpha}$$

In some alternative implementations, the ranking can be performed using Kullback-Leibler divergence (KL divergence) or predictive-likelihood.

For a particular category related to the textual input 160, rankings of sequences of one or more words that are greater than a threshold ranking value, e.g., rankings greater than 0.25, can be identified for use in a summary of the textual input 160.

Figure 4:
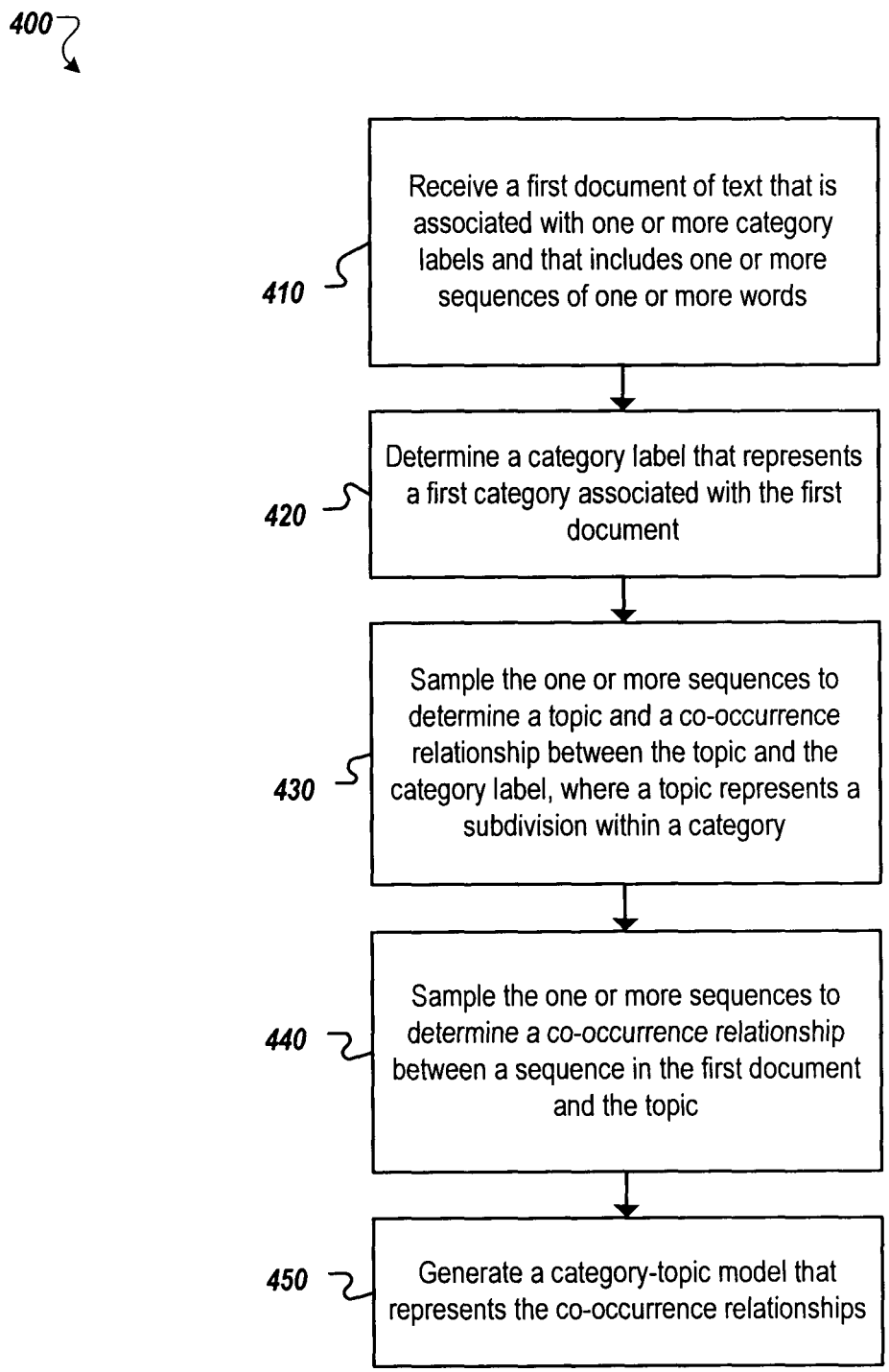
FIG. 4 is a flow chart showing an example process for generating a category-topic model.

FIG. 4 is a flow chart showing an example process 400 for generating a category-topic model. The process 400 includes receiving 410 a first document of text that is associated with one or more category labels and that includes one or more sequences of one or more words. The process 400 also includes determining 420 a category label that represents a first category associated with the first document. The process 400 also includes sampling 430 the one or more sequences to determine a topic and a co-occurrence relationship between the topic and the category label. A topic represents a subdivision within a category. The process 400 also includes sampling 440 the one or more sequences to determine a co-occurrence relationship between a sequence in the first document and the topic. The process 400 also includes generating 450 a category-topic model that represents the co-occurrence relationships.

Figure 5:
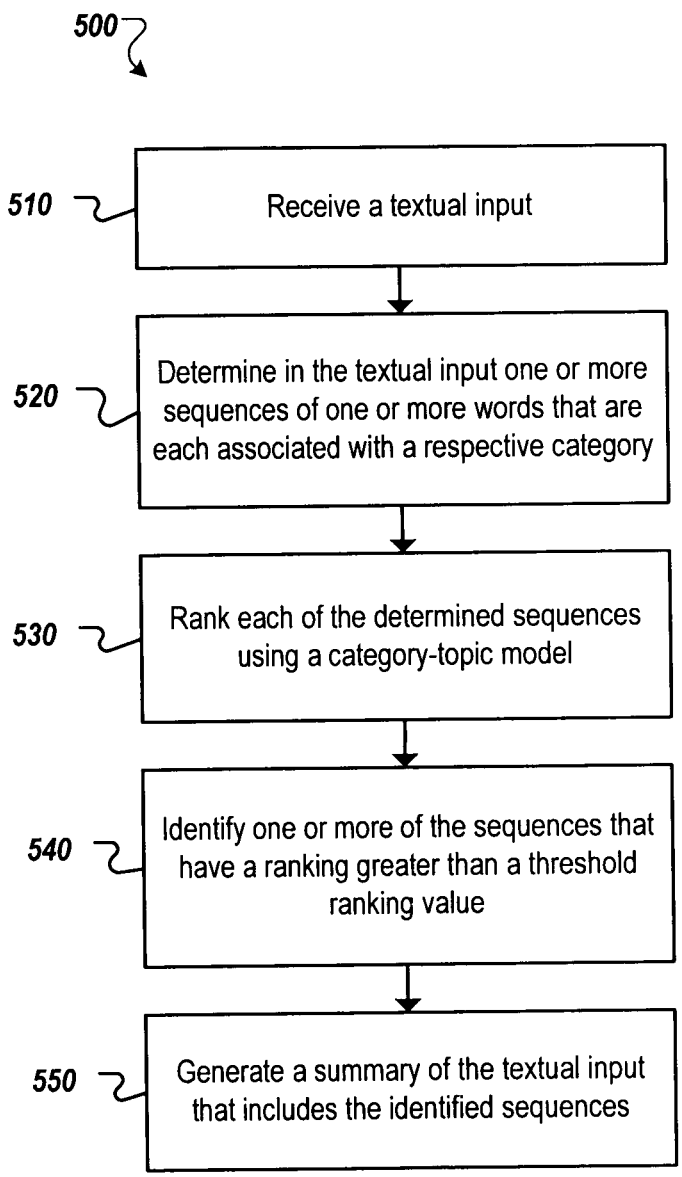
FIG. 5 is a flow chart showing an example process for ranking sequences of one or more words in a textual input to identify a subset of the sequences to be included in a summary of the textual input.

FIG. 5 is a flow chart showing an example process 500 for ranking sequences of one or more words in a textual input to identify a subset of the sequences to be included in a summary of the textual input. The process 500 includes receiving 510 a textual input, and determining 520 in the textual input one or more sequences of one or more words that are each associated with a respective category. The process 500 also includes ranking 530 each of the sequences using a category-topic model. The process 500 also includes identifying 540 one or more of the sequences that have a ranking greater than a threshold ranking value. The process 500 also includes generating 550 a summary of the textual input that includes the identified sequences.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

receiving a plurality of documents of text, wherein each document is associated with one or more category labels and includes one or more sequences of one or more words;

determining a plurality of topics from the plurality of documents, wherein each topic represents a subdivision of a respective category label;

performing a plurality of sampling iterations to generate a category-topic model that represents co-occurrence relationships between sequences and topics and co-occurrence relationships between topics and categories, wherein performing each of the plurality of sampling iterations comprises, for each sequence in each of the plurality of documents:

sampling a category label for the sequence from the category labels associated with the document that includes the sequence;

sampling a topic for the sequence; and updating current values of representations of the co-occurrence relationships based on the category label and the topic sampled for the sequence.

2. The method of claim 1, where generating a category-topic model further includes:

determining, from the co-occurrence relationship between the topic and the category label, a first probability of the topic being associated with a document given that the category label is associated with the document; and determining, from a co-occurrence relationship between the sequence and the topic, a second probability of the sequence occurring in the document given that the topic is associated with the document.

3. The method of claim 2, where sampling the category label and the topic comprises sampling the category label and the topic from a distribution that satisfies:

$$P(u_{d,i} = c, z_{d,i} = k \mid w_{d,i} = v, w_{d,-i}, z_{d,-i}, u_{d,-i}, y_d, \alpha, \beta) = \frac{C_{v,k}^{WT} + \beta}{\sum_{v'=1}^{V} C_{v',k}^{WT} + V\beta} \frac{C_{k,c}^{TC} + \alpha}{\sum_{k'=1}^{K} C_{k',c}^{TC} + K\alpha};$$

where $u_{d,i}$ is a category label; c is a particular category; $z_{d,i}$ is a topic; k is a particular topic; $w_{d,i}$ is a sequence of one or more words; v is a particular sequence of one or more words;

$C_{v,k}^{WT}$ is a number of times that topic k is assigned to sequence v, not including a current instance of sampling i; $C_{k,c}^{TC}$ is a number of times that topic k is assigned to category c, not including the current instance of sampling i; α is a constant; β is a constant; and d is a document.

4. The method of claim 3, wherein performing the plurality of sampling iterations comprises performing a respective portion of the sampling independently on each of multiple processors, and wherein each processor p calculates an update $\Delta C_{|p}^{WT}$ and an update $\Delta C_{|p}^{TC}$, and $C_{k,c}^{TC}$ and $C_{v,k}^{WT}$ are updated according to the expressions $$C^{WT} += \sum_{p=1}^{P} \Delta C_{|p}^{WT} \text{ and } C^{TC} += \sum_{p=1}^{P} \Delta C_{|p}^{TC}.$$

5. The method of claim 3, where the determining the first and second probabilities includes:
calculating the conditional probabilities that the topic is k given that the category label is c, the sequence is v given that the topic is k, the category label is c given that the topic is k, and the topic is k given that the sequence is v.

6. The method of claim 5, where the conditional probabilities satisfy the expressions:

$$P(z=k \mid u=c) = \frac{C_{k,c}^{TC} + \alpha}{\sum_{k'} C_{k',c}^{TC} + K\alpha};$$

$$P(w=v \mid z=k) = \frac{C_{v,k}^{WT} + \beta}{\sum_{v'} C_{v',k}^{WT} + V\beta};$$

$$P(u=c \mid z=k) = \frac{C_{k,c}^{TC} + \alpha}{\sum_{c'} C_{k,c'}^{TC} + C\alpha}; \text{ and}$$

$$P(z=k \mid w=v) = \frac{C_{v,k}^{WT} + \beta}{\sum_{k'} C_{v,k'}^{WT} + K\beta}.$$

7. The method of claim 1, further comprising:
receiving a textual input;
determining in the textual input one or more sequences of one or more words that are each associated with a respective category;
ranking each of the sequences using the category-topic model;
identifying one or more of the determined sequences that have a ranking greater than a threshold ranking value; and
generating a summary of the textual input that includes the identified sequences.

8. The method of claim 7, where the ranking includes calculating a probabilistic characteristic value for each sequence of one or more words, where the probabilistic characteristic value is expressed as:

$$P(w \mid c)P(c \mid w) = \left[\sum_{z=1}^{K} P(w \mid z)P(z \mid c)\right]\left[\sum_{z=1}^{K} P(z \mid w)P(c \mid z)\right],$$

where w is a sequence of one or more words, c is a category, and z is a topic.

9. The method of claim 1, where the category labels are human-readable.

10. The method of claim 1, where at least one of the topics is not human-readable.

11. The method of claim 1, where a sequence of one or more words is a phrase, sentence, or paragraph.

12. The method of claim 1, further comprising:
determining that a first document of the plurality of documents is not associated with any category labels; and
assigning a unique label to the first document.

13. A system comprising:
one or more computer-readable storage devices including computer program instructions; and
one or more computers operable to execute to execute the instructions to perform operations comprising:
receiving a plurality of documents of text, wherein each document is associated with one or more category labels and includes one or more sequences of one or more words;
determining a plurality of topics from the plurality of documents, wherein each topic represents a subdivision of a respective category label;
performing a plurality of sampling iterations to generate a category-topic model that represents co-occurrence relationships between sequences and topics and co-occurrence relationships between topics and categories, wherein performing each of the plurality of sampling iterations comprises, for each sequence in each of the plurality of documents:
sampling a category label for the sequence from the category labels associated with the document that includes the sequence;
sampling a topic for the sequence; and
updating current values of representations of the co-occurrence relationships based on the category label and the topic sampled for the sequence.

14. The system of claim 13, where sampling the category label and the topic comprises sampling the category label and the topic from a distribution that satisfies:

$$P(u_{d,i} = c, z_{d,i} = k \mid w_{d,i} = v, w_{d,-i}, z_{d,-i}, u_{d,-i}, y_d, \alpha, \beta) = \frac{C_{v,k}^{WT} + \beta}{\sum_{v'=1}^{V} C_{v,k}^{WT} + V\beta} \frac{C_{k,c}^{TC} + \alpha}{\sum_{k'=1}^{K} C_{k,c}^{TC} + K\alpha};$$

where $u_{d,i}$ is a category label; c is a particular category; $z_{d,i}$ is a topic; k is a particular topic; $w_{d,i}$ is a sequence of one or more words; v is a particular sequence of one or more words;
$C_{v,k}^{WT}$ is a number of times that topic k is assigned to sequence v, not including a current instance of sampling i; $C_{k,c}^{TC}$ is a number of times that topic k is assigned to category c, not including the current instance of sampling i; $\alpha$ is a constant; $\beta$ is a constant; and d is a document.

15. The system of claim 14, wherein performing the plurality of sampling iterations comprises performing a respective portion of the sampling independently on each of multiple processors, and wherein each processor p calculates an update $\Delta C_{|p}^{WT}$ and an update $\Delta C_{|p}^{TC}$, and $C_{TC}^{k,c}$ and $C_{v,k}^{WT}$ are updated according to the expressions $$C^{WT} += \sum_{p=1}^{P} \Delta C_{|p}^{WT}$$

and $$C^{TC} += \sum_{p=1}^{P} \Delta C_{|p}^{TC}.$$

16. The system of claim 15, where conditional probabilities satisfy the expressions:

$$P(z=k \mid u=c) = \frac{C_{k,c}^{TC} + \alpha}{\sum_{k'} C_{k',c}^{TC} + K\alpha};$$

-continued $$P(w=v\mid z=k) = \frac{C_{v,k}^{WT}+\beta}{\sum_{v'} C_{v',k}^{WT}+V\beta};$$

$$P(u=c\mid z=k) = \frac{C_{k,c}^{TC}+\alpha}{\sum_{c'} C_{k,c'}^{TC}+C\alpha}; \text{ and}$$

$$P(z=k\mid w=v) = \frac{C_{v,k}^{WT}+\beta}{\sum_{k'} C_{v,k}^{WT}+K\beta}.$$

17. One or more non-transitory computer-readable storage media encoded with instructions that, when executed by one or more computers, cause the one or more computers to perform operations comprising:
receiving a plurality of documents of text, wherein each document is associated with one or more category labels and includes one or more sequences of one or more words;
determining a plurality of topics from the plurality of documents, wherein each topic represents a subdivision of a respective category label;
performing a plurality of sampling iterations to generate a category-topic model that represents co-occurrence relationships between sequences and topics and co-occurrence relationships between topics and categories, wherein performing each of the plurality of sampling iterations comprises, for each sequence in each of the plurality of documents:
sampling a category label for the sequence from the category labels associated with the document that includes the sequence;
sampling a topic for the sequence; and
updating current values of representations of the co-occurrence relationships based on the category label and the topic sampled for the sequence.

18. The computer-readable storage media of claim 17, where sampling the category label and the topic comprises sampling the category label and the topic from a distribution that satisfies:

$$P(u_{d,i}=c, z_{d,i}=k\mid w_{d,i}=v, w_{d,-i}, z_{d,-i}, u_{d,-i}, y_d, \alpha, \beta) =$$

$$\frac{C_{v,k}^{WT}+\beta}{\sum_{v'=1}^{V} C_{v,k}^{WT}+V\beta} \frac{C_{k,c}^{TC}+\alpha}{\sum_{k'=1}^{K} C_{k,c}^{TC}+K\alpha};$$

where $u_{d,i}$ is a category label; c is a particular category; $z_{d,i}$ is a topic; k is a particular topic; $w_{d,i}$ is a sequence of one or more words; v is a particular sequence of one or more words; $C_{v,k}^{WT}$ is a number of times that topic k is assigned to sequence v, not including a current instance of sampling i; $C_{k,c}^{TC}$ is a number of times that topic k is assigned to category c, not including the current instance of sampling i; α is a constant; β is a constant; and d is a document.

19. The computer-readable storage media of claim 18, wherein performing the plurality of sampling iterations comprises performing a respective portion of the sampling independently on each of multiple processors, and wherein each processor p calculates an update $\Delta C_{|p}^{WT}$ and an update $\Delta C_{|p}^{TC}$, and $C_{k,c}^{TC}$ and $C_{v,k}^{WT}$ are updated according to the expressions $$C^{WT} \mathrel{+}= \sum_{p=1}^{P} \Delta C_{|p}^{WT}$$

and $$C^{TC} \mathrel{+}= \sum_{p=1}^{P} \Delta C_{|p}^{TC}.$$

20. The computer-readable storage media of claim 19, where conditional probabilities satisfy the expressions:

$$P(z=k\mid u=c) = \frac{C_{k,c}^{TC}+\alpha}{\sum_{k'} C_{k',c}^{TC}+K\alpha};$$

$$P(w=v\mid z=k) = \frac{C_{v,k}^{WT}+\beta}{\sum_{v'} C_{v',k}^{WT}+V\beta};$$

$$P(u=c\mid z=k) = \frac{C_{k,c}^{TC}+\alpha}{\sum_{c'} C_{k,c'}^{TC}+C\alpha}; \text{ and}$$

$$P(z=k\mid w=v) = \frac{C_{v,k}^{WT}+\beta}{\sum_{k'} C_{v,k}^{WT}+K\beta}.$$

* * * * *